United States Patent [19]

Mischutin

[11] 4,348,306

[45] * Sep. 7, 1982

[54] FLAME RETARDANTS

[75] Inventor: Vladimir Mischutin, Union City, N.J.

[73] Assignee: White Chemical Corporation, Bayonne, N.J.

[*] Notice: The portion of the term of this patent subsequent to Apr. 15, 1992, has been disclaimed.

[21] Appl. No.: 31,307

[22] Filed: Apr. 18, 1979

Related U.S. Application Data

[62] Division of Ser. No. 797,767, May 17, 1977, Pat. No. 4,158,077, which is a division of Ser. No. 538,896, Jan. 6, 1975, abandoned, which is a division of Ser. No. 300,732, Oct. 25, 1972, abandoned.

[51] Int. Cl.$^3$ .................................................. C09K 3/28
[52] U.S. Cl. ........................................ 252/608; 8/933; 106/18.24; 252/609; 428/283; 428/921
[58] Field of Search ................. 252/8.1, 608, 609; 106/18.24

[56] References Cited

U.S. PATENT DOCUMENTS

| | | | |
|---|---|---|---|
| T896,010 | 3/1972 | Lochmaier | 427/393.3 |
| 3,014,000 | 12/1961 | Read | 260/28.5 D |
| 3,432,461 | 3/1969 | Hill et al. | 252/8.1 X |
| 3,639,304 | 2/1972 | Raley, Jr. | 252/8.1 X |
| 3,658,634 | 4/1972 | Yanagi et al. | 428/395 X |
| 3,764,374 | 10/1973 | Barton et al. | 427/394 |
| 3,855,134 | 12/1974 | Green et al. | 252/8.1 |
| 4,120,798 | 10/1978 | Mischutin | 252/8.1 |

FOREIGN PATENT DOCUMENTS

| | | |
|---|---|---|
| F 9024 | 3/1956 | Fed. Rep. of Germany . |
| B 21344 | 9/1956 | Fed. Rep. of Germany . |
| 1222785 | 8/1966 | Fed. Rep. of Germany . |
| 1594962 | 3/1970 | Fed. Rep. of Germany . |
| 1444030 | 2/1971 | Fed. Rep. of Germany . |
| 2036204 | 2/1971 | Fed. Rep. of Germany . |

OTHER PUBLICATIONS

Diserens: Neveste Fortschritte und Verfahren in der Chemischen Technologie der Textilfasern, Birkhauser Verlag, Basel/Stuttgart, pp. 185, 199, (1965).

Janku: Beitrag zur Theorie der Flammfestausrustung von baum Woll Textilien, Melliand Textilberichte, pp. 1201–1210, (10–1971).

d'Ans Lax Taschenbuch fur Chemiker und Physiker, pp. 1394–1401, (1949).

*Primary Examiner*—Richard D. Lovering
*Attorney, Agent, or Firm*—Daniel J. Reardon; Eugene E. Geoffrey, Jr.

[57] ABSTRACT

A process for rendering synthetic materials, of synthetic fibers or mixtures of the same flame resistant which entails employing water insoluble flame retardant agents which are treated as colorless pigments, reduced to extremely finely divided condition, suspended in aqueous medium and applied as such or as part of a dispersed dye paste to the fabric, dried and set in place.

11 Claims, No Drawings

FLAME RETARDANTS

RELATED APPLICATION

This application is related to my copending application, filed of even date herewith, incorporated herein by reference and designated as Ser. No. 300,731, now U.S. Pat. No. 3,877,984, and is, in addition, a division of my copending application Ser. No. 797,767 filed May 17, 1977, now U.S. Pat. No. 4,158,077; which latter application is a divisional of my then copending application Ser. No. 538,896 filed Jan. 6, 1975, now abandoned; and which latter application is, in turn, a divisional application of my then copending application Ser. No. 300,732 filed Oct. 25, 1972, now abandoned.

BACKGROUND OF THE INVENTION

Purely for safety purposes, flame retardance or flame resistance of a fabric is a highly desirable characteristic. Of many methods available for developing various levels of flame retardancy all possess a variety of disadvantages, the principal ones being the inability of the flame retardant material, or treatment, to last through laundering or dry cleaning operations. Another principal disadvantage of treatments of fabrics to develop this characteristic of flame retardance is the loss of hand in the substrate. The problem is greatly aggravated in some areas of handling, particularly where it is necessary to meet statutory requirements for flame retardance in garments. Their physical condition being in the form of a bundle of fine fibers invites and encourages the sustenance of a flame if one gets started in the fabric. That is, a large area of oxidation is presented to any flame which gets started.

It is accordingly a basic object of this invention to provide a method employing familiar techniques in the textile industry for the application of flame retardant materials to textile fibers, whether the fibers be in the form of woven cloth, knitted cloth or in the form of balls of the thread prior to being woven into the cloth.

It is another object of the invention to provide technique which can be melded with the dispersed dyestuff application techniques for rendering fabric flame retardant.

Other objects and advantages of the invention will in part be obvious and in part appear hereinafter.

DESCRIPTION OF THE INVENTION

The present invention relates to a novel approach to flame proofing disperse dyeable synthetic materials which entails a process similar to dyeing but using colorless pigments with flame retardant properties. The colorless pigments are highly brominated aromatic and cyclic aliphatic compounds, which are extremely heat stable, high melting solids, which in addition are easily pulverized by milling to any desired particle size, ranging from 1 to 2 microns in average diameter.

Once the particles of the brominated compounds have been reduced to the optimum size, they are dispersed in water, at any concentration, by slowly adding them to water under strong agitation with a high speed, high shear mixer. In some cases a strong surface active agent must be added to effect uniform and thorough wetting of the flame retardant particles e.g. about 0.5% to about 2.5%. After addition of the solid has been completed, the resulting dispersion can be stabilized by adding small quantities of a protective colloid (commonly called thickener) such as carboxymethylcellulose, ethoxy- or methoxycellulose of selected molecular weight to achieve an optimum viscosity to prevent the fine particles from settling. The resulting milky, viscous paste remains stable for an indefinite length of time, if stored under normal storing conditions.

The dispersion obtained as described above, can be applied to disperse dyeable synthetic materials by exhaustion or padding techniques, normally employed to dye these materials. The dispersion, general preparation procedure of, was described above, will be referred to as "FR Dispersion".

The FR Dispersion can be applied by three different techniques:

I. Batch process, at atmospheric pressure in presence of dye carrier with or without a dye levelling agent, commonly known as atmospheric dyeing process;

II. Batch process, under pressure, with or without a carrier and/or levelling agent, commonly referred to as pressure dyeing process;

III. Continuous process, at atmospheric pressure without the use of carriers and or levelling agents, commonly called as the thermosol process.

I. Atmospheric Batch Application

This operation is normally performed by immersing the goods to be processed in water contained in a suitable vessel at room temperature, wetting them thoroughly in the same and then heating them to a predetermined temperature. At this point a dye carrier if necessary, a levelling agent, and any other desired auxiliary, are added. The good are thoroughly wetted in this solution. At this point the FR Dispersion and the disperse dyestuffs, if necessary, are incorporated in any given order, at regular intervals to allow the solution to reach quilibrium. The solution containing the goods, which at all times are maintained in constant motion by mechanical means, is slowly heated to the boil and boiled for a prolonged period of time. A sample of the material is now pulled and checked for color and flammability. Adjustments, if needed, are now made and the bath cooled replaced with solution of a scouring agent, and the goods are scoured and rinsed.

The above described process mainly applied to textile materials, but is not exclusive for the same and can be used on staple tow, continuous filament or spun yarns, piece goods, such as knits, woven, non-woven fabrics, carpets, continuous films and the like.

This operation if normally carried out on becks, jigs, skein dyeing machines, tow and staple dyeing machines and the like.

The dye carriers are normally water insoluble organic materials which can be made water dispersible or emulsifiable by addition of suitable emulsifying or dispersing e.g. anionic dispersing agents in an amount, illustratively, of about 0.5% to about 2.5%. The best known carriers are trichlorobenzene, biphenyl, orthophenyl phenol, butyl benzoate, methyl naphthalene, dichlorobenzene, perchloroethylene and the like. The mechanism of dyeing with carriers has been extensively studied and many more or less well-founded theories have been voiced on the subject. However, the mechanism of carriers is inconsequential to the scope of this invention.

The term disperse dyestuff applies to finely divided pigmentary organic materials of micron or submicron particle size dispersed or dispersible in water under given conditions. These materials are known to impart color fastness under most conditions, to hard to dye materials. The brominated aromatic compounds used in this invention, are similar to disperse dyes in their physical characteristics and their behavior towards some synthetic materials in the respect of their absorptivity and fastness when applied to those materials as described above.

II. Pressure, Batch Application

Another means of dyeing disperse dyeable materials is using hermetically closed vessels and raising the temperature above the atmospheric boiling point of water. This high temperature has an effect similar to the one exerted by dye carriers and the need for carriers to effect the dyeing operation is either completely eliminated or reduced to a minimum. Water at high temperature, normally around 125° C., appears to have a similar carrier effect as the materials listed above have been found to have.

The equipment used in this case is similar to that described above for dyeing at atmospheric pressure, with the difference that in this case it is tightly closed. The machines most commonly used are the yarn package dyeing machine, Burlington Engineering's Pressure Beck, Gaston County's Jet Dyeing Machine and others based on the same pressure dyeing principle.

The carriers used in this case are similar or the same as used in atmospheric dyeing and the dyeing procedure is also much the same as above with the difference that the dye bath is heated to ±125° C.

In this case again the FR Dispersions show the same behavior as disperse dyes and are absorbed by the disperse dyeable materials.

III. ATMOSPHERIC, CONTINUOUS APPLICATION

In the case of continuous application by the pad-dry-thermosol process, the brominated aromatic material must possess a melting point 20°–30° C., lower than the thermosol temperature employed, but the melting point must be 10°–20° C., higher than the drying temperature used. In addition the brominated compounds must not undergo decomposition at the thermosol temperatures and/or change its color crystalline structure, etc., at those temperatures. The preferred brominated materials melt between 125° C., and 175° C., and remain stable, without discoloration and/or evaporation when heated to 250° C., and maintained at this temperature for 5 minutes.

The brominated flame retardant, predispersed in water, is dissolved in a predetermined amount of water and the disperse dyes, if needed, and any auxiliary required, are added to this solution. The material to be treated is then dipped in this treating bath and the excess removed by squeezing it between two rollers. The wet material is then dried by passing it over a series of hot cans, between sets of infrared dryers, through a chamber with circulating hot air or any other means available for drying, at temperatures ranging between 100° C., and 125° C., for a period of time long enough to reduce the moisture content of the treated goods as close to zero as possible.

The goods thus treated are then baked at temperatures ranging between 200° C., and 250° C., immediately after drying or at any convenient time thereafter for periods of time between 1 minute and 3 minutes. This heat treatment, normally referred to as thermosoling, has the effect of melting the brominated materials and driving it into the core of the substrate resulting in a permanent fixation of the same. The brominated treating material must not sublime or evaporate at the thermosol temperatures, since condensation on colder surfaces of the thermosol machines and dripping onto the goods being treated will result in unwanted spotting of the same. The brominated materials must also not discolor at the thermosol temperatures since this will result in yellowing of white goods or shade change of dyed goods. The brominated compounds must also not interact with the disperse dyestuffs, any other auxiliary they are used in conjunction with and/or the material they are applied to, at room or elevated temperatures, since this might lead to severe color changes of the dyes, impaired yield, degradation of the substrate, corrosion of the machinery, etc.

The goods can now be soaped off in any convenient way, to remove surface or loose particles. This step is unimportant to the scope of the invention.

The process of this invention, is applicable to textile materials, in staple, tow, yarn, woven, non-woven, circular knitted, tricot knitted, raschel knitted, double knitted, crimped, texturized, flocked, tufted, etc., form to continuous films, sheets, etc., used for packaging, decorations, insulation, etc., and any other material dyeable by the pad-dry-thermosol process.

The chemical nature of the treated materials is a polymer obtained by condensation of terephthalic acid with a glycol, normally ethylene or propylene glycol, known under the generic name of polyester. The polymer might also be modified by copolymerization with other materials so as to achieve any desired special effect.

The flame retardant treatment thus applied will withstand any conventional way of cleaning, will not affect, hand, color, texture, appearance, etc., of the substrate, will not, if appropriate compounds are used, degrade by the action of sunlight, heat, moisture aging, bacterial action, etc., alone or in combination with each other.

DESCRIPTION OF THE PREFERRED EMBODIMENTS

The present invention utilizes brominated aromatic compounds, preferably brominated as flame retarding materials. The preferred aromatic compounds employed are derivatives of:

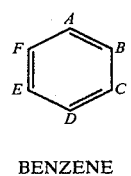
BENZENE
I

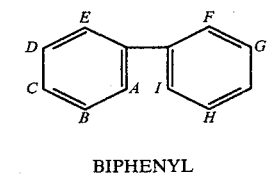
BIPHENYL
II

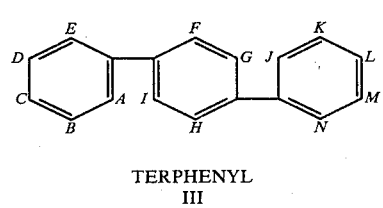
TERPHENYL
III

-continued

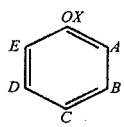
PHENOL
IV

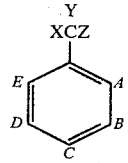
TOLUENE
V

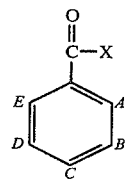
BENZOIC ACID
VI

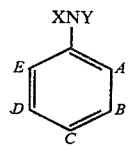
ANILINE
VII

Where A through N are the same or different and can be H, Br, $CH_3$, $C_2H_5$, $C_3H_7$,

$C_4H_9$ and the like; and X, Y, Z can be the same or different and can be H, $CH_3$, $C_2H_5$, $C_3H_7$, $C_6H_5$,

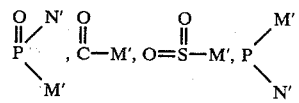

and the like; wherein N' and M' are the same or different and can be chosen among H, $NH_4$, $NH_2$, Na, K, Li, Ca, Mg, Ba, Sb, Ti, I, and the like.

Aliphatic cyclic compounds of the nature:

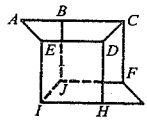 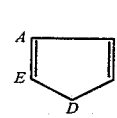 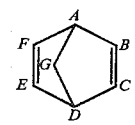

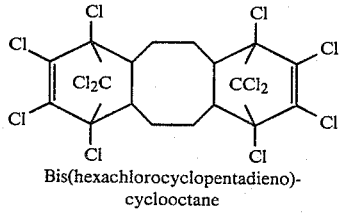
Bis(hexachlorocyclopentadieno)-
cyclooctane

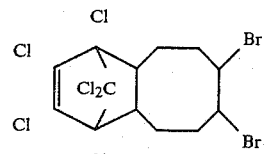
Dibromohexachlorocyclopentadieno-
cyclooctane

-continued

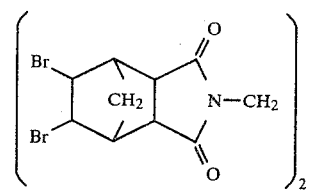
$N_1N^1$-ethylbis(dibromonorbornane-
dicarboximide

The preferred entities are:
1. Polybrominated benzenes of the general formula:

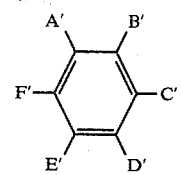

where A' to F' are the same or different and may be H or Br, with at least one Br present on the benzene ring.

2. Polybromo monoalkyl benzene of the general formula:

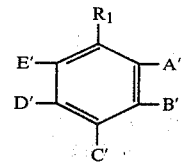

where $R_1$ may be alkyl, preferably of 1–5 carbons such as methyl, ethyl, propyl, butyl, pentyl, isopropyl, tert butyl; unsaturated alkyls haloalkyl or polyhaloalkyl wherein the moiety may include up to four bromine atoms where the halogens are chlorine and/or bromine and A', B', C', D', E' are as defined in numbered paragraph 1 immediately preceding.

3. Polybromo dialkyl benzene of the general formula:

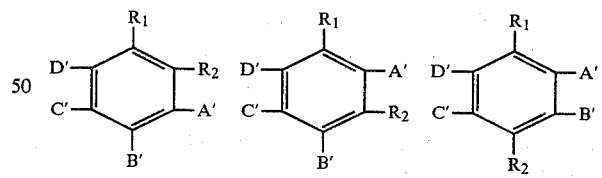

where $R_1$ and $R_2$ are the same or different and are the same as to $R_1$ in numbered paragraph 2 immediately preceding.

4. Polybrominated phenols of the general formula:

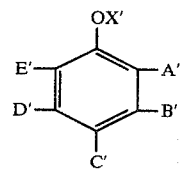

wherein X' is H, $R_1$,

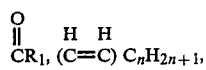

wherein n is 1 to 4, C₆H₅, Cl or Br;

where $R_3$ and $R_4$ are the same or different and can be H, alkyl preferably of 1-5 carbon atoms, bromoalkyl, polybromoalkyl and the like; aryl, phenyl, bromoaryl, bromophenyl, polybromoaryl, polybromophenyl, $NH_4$, $NH_2$, Na, K, Li, Ca, Ba, Sb, Ti and the like; or

wherein $R_3$ is as defined hereinabove.

5. Polybrominated biphenyls of the general formula:

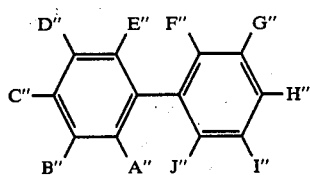

where A'' to J'' are the same or different and are H, Br, lower alkyl $C_1$ to $C_5$, aryl, OH

X being OH, $NH_2$, $ONH_4$, Na, K and the like.

6. Polybrominated terphenyls of the general formula:

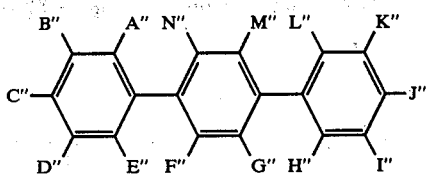

where A'' to N'' have the values assigned to A'' to J'' in numbered paragraph 5 hereof.

7. Polybrominated aniline of the general formula:

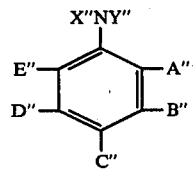

where A'' to E'' have the values assigned to A'' to N'' in numbered paragraph 6 immediately preceding, and X'' and Y'' are H, lower alkyl $C_1$ to $C_5$, aryl, bromoalkyl, polybromoalkyl, bromoaryl, polybromoaryl phenyl bromophenyl, polybromophenyl and the like.

8. Polybrominated aromatic mono and polyacids, anhydrides or esters of the same or the general formula:

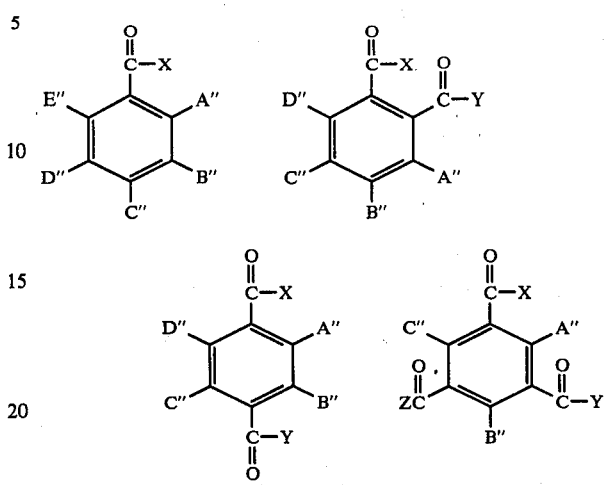

9. Polybrominated bisphenol A of the general formula:

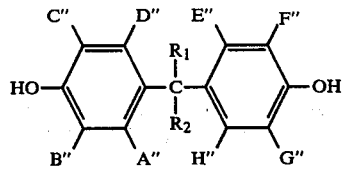

wherein A'' to H'' have the values assigned in numbered paragraph 5 hereinabove; and $R_1$ and $R_2$ have the values assigned in numbered paragraph 3 above.

In the process of preparing the proofing agents of the present invention the polyhalogenated solid material is milled to a convenient particle size, ranging from 0.1 to 10 microns, using any suitable means such as pebble mills, hammer mills, sand grinders, jet grinders and the like.

The water-insoluble organic bromine compound is present in one embodiment of the invention in a concentration of up to about 75 percent, such as 50 percent to 75 percent. It is also true that the fine powder thus obtained is dispersed in 0.25 to 1 part, preferably, 0.3 to 0.4 parts of water containing a small amount (0.1 to 0.5%) of a nonionic wetting agent of the ethoxylated nonylphenol type. Using a high speed high shear mixer or blender the dispersion is stabilized with a small amount e.g. an amount of about 1% to about 5% of a protective colloid such as hydroxyethyl cellulose. A smaller proportion of 0.2 to 0.5% or more of the latter is normally sufficient, however.

The resultant product may be used in the concentration thus obtained or may be diluted with 0.5 to 10 parts of water to each part of the dispersion.

The substrate to be treated is immersed in the resultant dispersion which can also contain 5 to 30% of the weight of the goods of a dye carrier and then slowly heated to the boil if open equipment is used or to 110°-140° C., preferably 125° C., if a sealed machine is used. This solution can also contain disperse dyestuffs as well as the flame retarder. This solution is now maintained at the desired temperature for 1-5 hours, preferably 1–2 hours allowing the dyes and the flame retardant to exhaust uniformly onto the substrate being treated.

After the operation has been completed the treating solution is cooled to room temperature and discarded. The goods are then rinsed to remove any surface deposits and dried by any convenient means at any convenient temperature.

Another means of applying the fire retardant is by dipping the substrate to be treated in a dispersion containing 5–50%, preferably 10–25%, of the concentrated flame retardant dispersion insuring complete and even impregnation and the excess solution removed, suitably by pressing between two rollers or the like. The treated substrate is then air dried at between 100° and 120° C., and baked between 175° and 225° C., for 30 to 120 seconds.

The substrates which might be treated by this method include all synthetic thermoplastic materials which are dyeable with disperse dyestuffs, which include polyester, polypropylene, polyethylene, cellulose di and tri acetates.

The substrate to be treated may be in the form of staple, tow, filaments, yarn, thread, continuous fiber, woven, knitted and non-woven fabrics, carpet, sheets, films and the like. The quantities to be used will vary depending on the construction of the material, its flammability and the flame retardant specification to be met.

EXAMPLE I 70 parts of finely pulverized hexabromo benzene having an average particle size of 1.5 microns were slowly added to 30 parts of water, under rapid agitation, containing 0.25% of an ethoxylated nonyl phenol type wetting agent. After addition was completed the agitation was continued for an extra 15 minutes. To this dispersion 10 parts of a 4% hydroxyethyl cellulose solution in water having a viscosity of approximately 300,000 centipoises were added and the resulting dispersion was agitated for an additional 15 minutes. This dispersion was designated I.

A piece of a spun woven polyester fabric weighing 10 grams fastened to a rod was immersed in 150 milliliters of water at room temperature with a pH of 6.0 and adjusted with monosodium phosphate contained in a beaker. This beaker was placed in an oil bath. The rod was now attached to a mechanism which imparted an up and down motion at a rate of 20 strokes per minute. The oil bath was now heated by means of an electrical resistance until the temperature of the water reached 50° C. Heating was now interrupted and 2.5 grams of self-emulsifiable biphenyl predissolved in 2.5 grams of water at 50° C. were added as a swelling agent. This solution was maintained at 50° C. for 10 minutes to allow the biphenyl to penetrate the fabric. At this point 2 grams of dispersion I and 1 gram of disperse Blue 1 (color index #42025) were added. This solution was now heated, at a rate of 0.5° C., per minute, to the boil. The bath was maintained at the boil for 2 hours. At this point the beaker was removed from the oil bath and placed in a cooling bath. The rod with the fabric was removed from the beaker and rinsed using running water at room temperature. The fabric was removed from the rod and dried in an oven at 105° C.

The fabric was now folded and sewn with a non flame retarded cotton thread to form a seam. The flammability along the seam was now tested using method DOC FF3-71 giving a void area of 1.5 inches initially and 2.0 inches after 50 launderings and tumble dryings.

A similar fabric non flame retarded was consumed entirely when tested by this method.

EXAMPLE II 70 parts of finely pulverized tetrabromo ortho chlorotoluene having an average particle size of less than 2 microns was dispersed in water in the same manner as dispersion I. This dispersion was designated II.

A piece weighing 10 grams of a tufted polypropylene carpet with a jute backing was treated similarly as in Example I, but using 1.0 grams of dispersion II. After dyeing cycle was completed the carpet was dried at 80° C. until dry.

The dyed carpet exhibited approximately 10% less color than a sample dyed similarly but without the flame retardant.

The flammability of the treated carpet was tested using flammability standard for carpets and rugs DOC FF1-70, giving a burn 1 inch in diameter, whereas the control carpet was totally consumed when tested by this procedure.

EXAMPLE III 70 parts of pulverized tris tribromophenyl phosphate having a particle size less than 2 microns was dispersed in water in the same fashion as dispersion I.

A package of 100% polyester filament yarn weighing approximately 1,000 grams, wound on a spring type tube, was placed in a closed vessel equipped with a heating element and a centrifugal pump which would pump liquid through the center to the periphery of the package. A funnel type vessel equipped with a valve is connected to the inlet of the pump. This is used to make additions of chemicals and/or dyes. The vessel containing the package was covered with a lid which was then fastened tightly with bolts.

Approximately 8 liters of water at room temperature were pumped into the dye vessel with this liquid circulating through the package. The water was heated to 110° C. and the pH adjusted to 6.0 with monosodium phosphate. The liquid was circulated for 5 minutes at the same temperature. At this point 50 grams of disperse yellow #3 (color index #11855) pasted in 50 grams of water containing 0.1% dispersing agent were allowed to flow into the dye chamber. This solution was allowed to circulate through the package for 5 minutes. At this point 50 grams of dispersion III were added and the solution circulated for 5 minutes. 50 grams of self-emulsifiable 1,3,4 trichlorobenzene were now added and heating was begun at a rate of 1° C. per minute until a temperature of 121° C. was reached. The solution was maintained at this temperature for 60 minutes and then allowed to cool to 70°–80° C. when it was discharged and replaced with water containing 1 gr/lt tetrasodium pyrophosphate 1 gr/lt sodium hydrosulphite and 0.5 grs/lt non-ionic detergent at 70° C. and with this liquid circulating through the yarn package the temperature was raised to 100° C. and maintained at the same for 20 minutes. The scouring solution was now discharged and replaced with water at 50° C. The water was drained off, the package removed from the vessel and air dried in an oven at 105° C.

The yarn from the package was now knitted into a sock, a fold was made in this sock which was stitched with a sewing machine using non-flame retarded cotton thread resembling a seam and the flammability was tested along this seam following method described in DOC FF3-71, flammability of children's sleepwear.

The sample treated as described above gave a void area of 2½ inches, while a sample dyed under the same conditions, but without dispersion was consumed in its entire length. No difference in coloration was seen when both samples were compared visually.

EXAMPLE IV 70 parts of hexabromo biphenyl having an average particle size of 2 microns and a melting point between 136° C. and 150° C. was dispersed in 30 parts of water in the same fashion as dispersion I. This suspension was designated dispersion V.

20 parts of dispersion V were dissolved in 80 parts of water and 0.5 parts of an alkyl-aryl sulfonate wetting agent were added to this solution.

A piece of 100% polyester double knit fabric was immersed in this solution and the excess removed by squeezing it between two rollers. The fabric picked up 110% of its weight of the solution and was now air dried in an oven at 105° C. The particles of hexabromobiphenyl were noticeable on the surface and would become loose on shaking the fabric. The treated material was now baked at 200° C. for 90 seconds in a forced air oven. The banking had the effect of melting the flame retardant and driving it into the core of the fiber. No dusting off was observed after the baking operation.

The treated fabric was judged flame retardant when tested according to standard for the flammability of children's sleepwear DOC FF3-71.

In recapitulation, it will be apparent from inspection of the examples that my technique for rendering a fabric flame retardant is to disperse it in the fabric. In so doing I formulate the flame retarding material in an extremely fine particle size suspended in an aqueous medium with a protective colloid material so that a solution or dispersion of this can be used for padding of the material. Generally the materials used will be in the form of fibers, but fabrics are also contemplated. The end result is that the extremely fine particles enter the fibers and on drying of the paste in which they are incorporated, or mere aqueous suspension in which they are used, they are mechanically included within the surface of the fiber itself, there to function as the flame retardant. To obtain maximum dispersion I have found that particle size of 0.10 micron or smaller is desirable that the particle sizes up to 3 microns average particle diameter, are useful. Generally, the one to 2 micron range is preferred.

When I speak of particle size I speak of the average in statistical terms. This is measured either in a Colter Counter or a Fisher Counter, or a microscopic measurement. Also sedimentation rates are sometimes used. The techniques for accomplishing such measurements are generally quite well known among chemists and need not be set forth herein in detail.

An inherent fundamental requirement of the process however is that the material used as the flame retardant be a highly insoluble compound. Hence, ideally, the flame retardant material will show a statistical particle size wherein about 90% or more of the particles will be under 2 microns in diameter.

If the particles could be reduced to less than one micron, in diameter, it would be advantageous in the fabric and thus would not cause loss of luster.

As suspending agents, various organic protective colloidal materials soluble in water are useful. For example, the Cellosize materials, and ethoxy cellulose, methoxy cellulose and other carboxyalkyl celluloses are quite useful. Polyvinylacetate is useful also. Genrally, any colloidal protective material which is virtually inert on a fabric and serves to hold the materials in suspension will be useful.

I have specified that the material should be highly insoluble. Basically, the more insoluble the material the better. Generally, I prefer to confine the use of the flame retardants to those showing insolubility of less of 1/10th part per 1000 parts of solvent.

Using the techniques and formulations of any of the examples given, namely 1 through 7, the following compounds may be used for application to the various bases identified in the several examples:

Polybrominated biphenyl = hexabromo
Polybrominated biphenyl oxide = decabromo biphenyl oxide
Polybrominated benzene = hexabromo
Polybrominated toluene = pentabromo toluene
Polybrominated chlorotoluene = tetrabromine
Polybrominated phenol = pentabromo phenol
Polybrominated aniline = tribromo aniline
Polybrominated benzoic acid = dibromo benzoic acid
Tris phosphates of polybrominated phenols
Polybrominated cyclopentane = tetrabromo cyclo
Polybrominated cyclohexane = hexabromo cyclo
Polybrominated cyclooctane = hexabromo cyclo
Polybrominated cyclodecane = hexabromo cyclo
Polybrominated cyclododecane = hexabromo cyclo
Hexachlorocyclopentadieno-dibromocyclooctane = -hexabromo cyclo
N,N'-ethyl-bis(dibromo-norbornene-dicarboximide) = -hexabromo cyclo
Per chloro penta cyclodecane.

The matter of flammability of a material and particularly the flammability of a fabric is something which is purely relative. Virtually any organic compound because it is composed of carbon-hydrogen-oxygen atoms will burn if conditions are right. As a matter of public safety those materials which go into general circulation and general public use which have high natural flammability are currently the subject matter or rather close regulation. The regulations stem from statutory authority given to the Department of Commerce which has issued regulations defining flammability, principally of fabrics. In all of the examples of this specification and the use of the variety of compounds mentioned, the basic problem is to attain a level of flame retardance in material treated which will at least meet the standards established by the Department of Commerce under its statutory authority. Thus, these regulations are summarized as follows:

FLAME RETARDANCY TEST

Department of Commerce Fabric Flammability 3-71 (DOC-FF) Public Law No. 88, 1953, 83rd Congress, amended 1956, sets up standards for flame retardancy.

Public Law 90, 90th Congress, Department of Commerce regulations set up standards of flammability.

Department of Commerce Fabric Flammability 1-70, Federal Register 35, 74, Apr. 16, 1970, sets up standard for carpets and rugs; expanded Dec. 29, 1970, Federal Register 35, 251, small carpets and rugs, Dec. 29, 1970.

Department of Commerce Fabric Flammability 3-71; Children's Sleepwear standard for flammability; Federal Register 36, 146, July 29, 1971.

Department of Commerce Fabric Flammability 4-72, sets up standards for mattresses.

Department of Transportation-Automotive Safety standard No. 302 deals with flammability of interior materials for cars.

The Federal Hazardous Substances Act also establishes certain standards of flammability but these standards are within the scope of the tests outlined. In other words it would appear that as a practical matter of operativeness the flammability of a material if it is to be considered nonflammable should be equivalent to that required under the regulations.

In summary and as a possible reference point I have tabulated in the following the identity of the product, the agency whose regulations apply and the nature of tests, etc., which is established by its authority.

FIRE SAFETY REGULATIONS

| MARKET/PRODUCT | CONTROLLING AGENCY | STATUS | SPECIFIED TEST | EFFECT ON PRODUCT & PHYSICAL PROPERTIES | EFFECT ON COST |
|---|---|---|---|---|---|
| Carpets (over 24 sq. ft) home use | Department of Commerce | Final standard in effect 4/16/71 | Pill test | Essentially eliminates use of cotton and rayon and some shag rugs. | Very little except where inexpensive cotton and rayon carpets eliminated |
| Carpets institutional | Local, State or Federal (HEW,VA) | Varies | Usually Tunnel Test or Underwriters Chamber | Most will be tight (short pile) construction for face yarn. Alumina trihydrate used in backing will not effect properties. | Less than 1% increase |
| Carpets (under 24 sq. ft.) home use | Department of Commerce | Final standard in effect 12/28/71 | Pill test or warning label | Most rugs will probably use warning label. Others will have harsher hand for cotton rugs or will switch to acetate synthetic blends. | 5-10% increase for cotton treated with no effect on other |
| Automotive interiors (passenger cars, multi-purpose passenger vehicles, trucks and buses) | Department of Transportaion | Final standard in effect 9/1/72 | Horizontal burning rate test | Should not be greatly effected. Some strength properties may be lowered. | Cost of interior materials to automobile companies should form 3-10%. |
| Childrens' sleepwear woven and knit sleepwear up to size 6X | Department of Commerce | Final standard in effect 7/29/72 may label until 7/29/73 | Vertical char length test | Hand may be harsher and strength properties could be lower for woven goods. Knit goods should not be effected. | Finished woven cloth could cost 33% more. Knit sleepwear costs about 10% more. |
| Wearing apparel and fabric (dresses, costumes and all other articles except hat, gloves, shoes) | Department of Commerce | Flammable Fabrics Act of 1954 | 45 Degree Test | Some garments have been eliminated, Others such as costumes are not washable. | Very little |
| Mattresses Foam rubber urethane foam cotton ticking | Department of Commerce | Notice of finding published 6/10/70 | None established yet; cigarette test suggested | Should not effect properties greatly. | Costs could be increased 5-10%. |
| Mattresses (home & institutional) | Local & State | Pending | Vary | Should not effect properties greatly. | Costs could be increased 10-20%. |
| Blankets | Dept. of Commerce | Notice of finding published 6/10/70 | None established yet — | Probably eliminate rayon blankets. A treated cotton blanket will have harsher hand. | Costs could be increased 5-10% cotton blankets. increase for wool acrylic. |
| Hospitals and Nursing homes (All materials of construction including wood, plastics, foam, film and fabric) | Department of Health, Education and Welfare Administration Veterans Administration | Some in effect Some under consideration | ASTM E-119 ASTM E-84 | Minor effects on properties and structural materials. Esthetic properties of fabrics may be reduced. | Costs could be increased 5-10% |
| Home and Commercial Construction (All Building Materials) | Local and State Codes Dept. of Housing and Urban Development | Local Codes in effect HUD considering regs. as part of "Operation Breakthrough" | Vary Many new methods being developed | Many local codes require use of specific materials. Federal regulations probably will be performance oriented. So many materials covered it is difficult to assess property effects. | Difficult to assess |
| Aircraft (Hall interior material such as fabric, film, foam, and composites.) | Department of Transportation (FAA) | (a) Regulation in effect (b) Proposed regulation change | Vertical char length and horizontal burn rate. Vertical char length and horizontal burn rate with tighter specs. | May decrease esthetic and/or strength properties. | Manufacturers may change to high price products to meet f/r standards and retain good physical properties. Cost change could be great but still insignificant compared to total |

-continued

FIRE SAFETY REGULATIONS

| MARKET/PRODUCT | CONTROLLING AGENCY | STATUS | SPECIFIED TEST | EFFECT ON PRODUCT & PHYSICAL PROPERTIES | EFFECT ON COST |
|---|---|---|---|---|---|
| Electrical and electronic including wiring systems, appliances, instruments computers, etc. | Underwriters Laboratories Lists | In effect | Vary | Fire retardants frequently reduce physical strength or electrical properties of components. | plane cost. May increase costs 10–30% |
| UPDATE | | | | | |
| Mattresses for the home | Department of Commerce | Proposed regulation issued 9/9/71 | Cigarette Test | Will probably be met using changes in the construction. | Small (2–5%) increase in cost |
| | State of California | Proposed regulation issued 10/71 | Bayonet Heater Test | May require extensive use of fire retardant chemicals. | Cost could be increased 10–25% |

(1) California may withdraw their regulation in favor of the one proposed by the Dept. of Commerce.

What is claimed is:

1. As a new product, a composition having the ability to impart flame retardant characteristics to synthetic organic materials which comprises:
    a water-insoluble, solid, aromatic, organic brominated compound,
    a wetting agent for said organic compound,
    a protective colloidal material, and
    a water medium wherein the brominated organic compound is suspended in finely divided form, with substantially all of the particles thereof under 10 microns in average diameter.

2. A composition in accordance with claim 1 in which the water insoluble organic brominated compound is present in amount from about 50% to 75%,
    the wetting agent is present in an amount from about ½% to about 2.5%, and
    the protective colloidal material is present in an amount from about 1% to 5%.

3. A new product as claimed in claim 1, wherein said composition includes an anionic dispersing agent.

4. A new product as claimed in claim 3, wherein said anionic dispersing agent is present in an amount by weight of from 0.5 percent to 2.5 percent.

5. As a new product, an aqueous medium composition having the ability to impart flame retardant characteristics to synthetic organic textile materials, which comprises by weight:
    a water-insoluble solid organic brominated compound, in an amount from about 50% to 75%,
    a wetting agent for the organic brominated compound, in an amount from about ½% to about 2.5%,
    a protective colloidal material, in an amount from 1% to 5% and,
    a water medium wherein the brominated organic compound is suspended in finely divided form, with substantially all of said particles under 2 microns in diameter.

6. As a new product, a composition having the ability to impart flame retardant characteristics to synthetic organic materials that comprises:
    a solid, water-insoluble, aromatic organic brominated compound,
    a wetting agent for the organic compound;
    a protective colloidal material, and
    a water medium wherein the brominated organic compound is suspended in finely divided form.

7. As a new product, a composition having the ability to impart flame retardant characteristics to synthetic organic materials, that comprises as a solid, water-insoluble, brominated organic component, a poly brominated biphenyl oxide, polybrominated biphenyl, polybrominated cyclododecane, polybrominated cyclohexane, polybrominated bisphenol A, or mixtures thereof;
    a wetting agent for said water insoluble brominated organic component;
    a protective colloid, and
    an aqueous medium wherein said brominated organic component is suspended in finely divided form.

8. A product as claimed in claim 7 wherein said brominated compound is present in a concentration of up to 75 percent by weight.

9. A product as claimed in claim 7 wherein said water-insoluble brominated organic component is a polybrominated biphenyl oxide.

10. A product as claimed in claim 9 wherein said polybrominated biphenyl oxide is decabromobiphenyl oxide.

11. A product as claimed in claim 7 wherein said polybrominated cyclododecane is hexabromocyclododecane.

* * * * *